(12) United States Patent
Fu et al.

(10) Patent No.: US 11,751,211 B2
(45) Date of Patent: Sep. 5, 2023

(54) METHOD FOR PROCESSING PHYSICAL RESOURCE AND USER EQUIPMENT

(71) Applicant: Samsung Electronics Co., Ltd., Gyeonggi-do (KR)

(72) Inventors: Jingxing Fu, Beijing (CN); Chen Qian, Beijing (CN); Bin Yu, Beijing (CN)

(73) Assignee: Samsung Electronics Co., Ltd

( * ) Notice: Subject to any disclaimer, the term of this patent is extended or adjusted under 35 U.S.C. 154(b) by 48 days.

(21) Appl. No.: 17/266,871

(22) PCT Filed: May 30, 2019

(86) PCT No.: PCT/KR2019/006522
§ 371 (c)(1),
(2) Date: Feb. 8, 2021

(87) PCT Pub. No.: WO2020/032364
PCT Pub. Date: Feb. 13, 2020

(65) Prior Publication Data
US 2021/0298056 A1  Sep. 23, 2021

(30) Foreign Application Priority Data

Aug. 9, 2018 (CN) .......................... 201810902834.X (51) Int. Cl.
*H04W 72/23* (2023.01)
*H04L 1/00* (2006.01)
(Continued)

(52) U.S. Cl.
CPC ........... *H04W 72/23* (2023.01); *H04L 1/0071* (2013.01); *H04W 72/0453* (2013.01);
(Continued)

(58) Field of Classification Search
None
See application file for complete search history.

(56) References Cited

U.S. PATENT DOCUMENTS

| | | | |
|---|---|---|---|
| 2017/0223686 A1* | 8/2017 | You | H04W 72/23 |
| 2017/0273110 A1 | 9/2017 | Chen | |

(Continued)

FOREIGN PATENT DOCUMENTS

| | | |
|---|---|---|
| CN | 106455087 | 2/2017 |
| CN | 107439046 | 12/2017 |
| EP | 3 282 803 | 2/2018 |

OTHER PUBLICATIONS

International Search Report dated Sep. 5, 2019 issued in counterpart application No. PCT/KR2019/006522, 3 pages.

(Continued)

*Primary Examiner* — Jenkey Van
(74) *Attorney, Agent, or Firm* — The Farrell Law Firm, P.C.

(57) ABSTRACT

The present application provides a method for processing a physical resource, a user equipment, and a base station. The method for processing a physical resource includes the following steps: determining scheduled physical resource blocks (PRB) based on indication information of carrier sensing result of at least one received frequency sub-band and indication information of physical resource blocks; and receiving data on the scheduled PRBs.

8 Claims, 3 Drawing Sheets

(51) Int. Cl.
H04W 72/0453 (2023.01)
H04W 72/1273 (2023.01)
H04W 74/08 (2009.01)
H04W 72/50 (2023.01)

(52) U.S. Cl.
CPC ..... H04W 72/1273 (2013.01); H04W 72/535 (2023.01); H04W 74/0808 (2013.01)

(56) References Cited

U.S. PATENT DOCUMENTS

| | | | | |
|---|---|---|---|---|
| 2018/0020479 | A1* | 1/2018 | Harada | H04W 74/006 |
| 2018/0027589 | A1 | 1/2018 | Yang | |
| 2018/0249499 | A1* | 8/2018 | Kim | H04W 74/08 |
| 2019/0190668 | A1* | 6/2019 | Lei | H04L 5/003 |
| 2019/0349815 | A1* | 11/2019 | Tiirola | H04W 72/12 |
| 2019/0349943 | A1* | 11/2019 | Wu | H04W 72/12 |
| 2020/0344758 | A1* | 10/2020 | Li | H04L 1/0071 |
| 2020/0374851 | A1* | 11/2020 | Zhou | H04W 72/042 |

OTHER PUBLICATIONS

Written Opinion dated Sep. 5, 2019 issued in counterpart application No. PCT/KR2019/006522, 6 pages.
Huawei, HiSilicon, 3GPP TSG RAN WG1 Meeting #92bis, R1-1803677, Sanya, China, Apr. 6, 2018, "Numerology and wideband operation in NR unlicensed", pp. 10.
Huawei, HiSilicon, 3GPP TSG RAN WG1 Meeting #92bis, R1-1803679, Sanya, China, Apr. 6, 2018, "Coexistence and channel access for NR unlicensed band operation", pp. 9.
Vivo, 3GPP TSG RAN WG1 Meeting #92, R1-1801557, Athens, Greece, Feb. 15, 2018, "Potential solutions and techniques for NR unlicensed spectrum", pp. 8.
3GPP, 3rd Generation Partnership Project; Technical Specification Group Radio Access Network; Evolved Universal Terrestrial Radio Access (E-UTRA).
Physical Layer Procedures (Release 12), 3GPP TS 36.213 V12.5.0, Mar. 25, 2015, 240 pages.
European Search Report dated Jul. 13, 2021 issued in counterpart application No. 19847157.5-1205, 9 pages.
Chinese Office Action dated Mar. 30, 2022 issued in counterpart application No. 201810902834.X, 16 pages.
Chinese Office Action dated Nov. 9, 2022 issued in counterpart application No. 201810902834.X, 12 pages.
European Search Report dated Dec. 5, 2022 issued in counterpart application No. 19847157.5-1206, 4 pages.

* cited by examiner

METHOD FOR PROCESSING PHYSICAL RESOURCE AND USER EQUIPMENT

PRIORITY

This application is a National Phase Entry of PCT International Application No. PCT/KR2019/006522, which was filed on May 30, 2019, and claims priority to Chinese Patent Application No. 201810902834.X, which was filed on Aug. 9, 2018, the entire content of each of which is incorporated herein by reference.

TECHNICAL FIELD

The present application relates to communication technologies, and in particular, to a method for processing a physical resource and a user equipment (UE).

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Brief Description of Drawings

The above and/or additional aspects and advantages of the present application will become apparent and readily understood by describing in detail embodiments thereof with reference to the accompanying drawings, in which.

BEST MODE FOR CARRYING OUT THE INVENTION

An object of the present application is to resolve at least one of the above technical drawbacks, in particular, to resolve the problem of how to properly utilize carrier resources.

In a first aspect, the present application provides a method for processing a physical resource, including the following steps: determining scheduled physical resource blocks (PRB) based on indication information of carrier sensing result of at least one received frequency sub-band and indication information of physical resource blocks; and receiving data on the scheduled PRBs.

In a second aspect, the present application provides a user equipment (UE), including: a determining unit, configured to determine scheduled physical resource blocks (PRB) based on indication information of carrier sensing result of at least one received frequency sub-band and indication information of physical resource blocks; and a receiving unit, configured to receive data on the scheduled PRBs.

In a third aspect, the present application provides an electronic device, including: a processor; and a memory, configured to store a computer program that, when executed by the processor, implements the steps of the foregoing method for processing a physical resource.

In the present application, scheduled physical resource blocks (PRB) are determined based on indication information of carrier sensing result of at least one received frequency sub-band and indication information of physical resource blocks; and data are received on the scheduled PRBs, thereby realizing reasonable use of carrier resources, fully utilizing resources of the frequency sub-band of which carrier sensing result is idle, simplifying the scheduling manner of resources, and reducing the bit error rate of the data.

Additional aspects and advantages of the present application will partly be presented in the following description, and become apparent in the following description or be appreciated in practicing of the present application.

MODE FOR THE INVENTION

The embodiments of the present application will be described in detail hereinafter, and examples of the embodiments are illustrated in the accompanying drawings, throughout which same or similar reference numerals refer to same or similar elements or elements having same or similar functions. The embodiments described hereinafter with reference to the drawings are illustrative, merely used for explaining the present application and should not be regarded as any limitations thereto.

It should be understood by those skill in the art that singular forms "a", "an", "the", and "said" may be intended to include plural forms as well, unless otherwise stated. It should be further understood that terms "include/comprise" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Those skilled in the art will appreciate that all terms (including technical terms and scientific terms) used herein have the same meaning as commonly understood by one of ordinary skill in the art to belonging to the field of the present application, unless otherwise defined. It should also be understood that those terms, such as those defined in a general dictionary, should be considered to have a meaning consistent with the meaning in the context of the prior art, and, unless clearly defined herein, should not be understood differently or as having an excessively formal meaning.

Those skilled in the art may understand that the "terminal" and "user equipment" as used herein include both a wireless signal receiver device only having a wireless signal receiver without a transmitting capability, and a receiving and transmitting hardware having a device capable of receiving and transmitting hardware for two-way communication over a two-way communication link. Such device may include: a cellular or other communication device having a single line display or a multi-line display, or a cellular or other communication device without a multi-line display; a personal communications service (PCS), which may combine voice, data processing, fax and/or data communication capabilities; a PDA (Personal Digital Assistant), which may include a radio frequency receiver, a pager, Internet/Intranet access, a web browser, a notepad, a calendar, and/or a GPS (Global Positioning System) receiver; a conventional laptop and/or a palmtop computer or other devices having a conventional laptop and/or palmtop computer or other devices and/or having a radio frequency receiver. As used herein, "terminal" and "user equipment" may be portable, transportable, installed in a vehicle (in aviation, sea and/or land), or adapted and/or configured to operate locally, and/or operated in any other location on the earth and/or space in a distributed form. As used herein, "terminal" and "user equipment" may also be a communication terminal, an internet terminal, and a music/video playing terminal, for example, a PDA, a MID (Mobile Internet Device), and/or a mobile phone having a music/video playback function, and may also be a smart TV, a set-top box and other devices.

In new radio (NR) air interface system, a bandwidth of a carrier is relatively large, and bandwidth capability of individual UE is limited, so that control information and data can only be transmitted or received within a part of the bandwidth of the carrier. However, some UEs have relatively strong bandwidth capability and can transmit or receive control information and data within the entire bandwidth of the carrier. Wherein the bandwidth capability of the UE refers to a maximum bandwidth that the UE can receive or transmit data on a frequency domain at the same time. For example, some UEs have bandwidth capability of 20 megahertz (MHz), and some UEs have bandwidth capability of 5 MHz. For a UE with a weak bandwidth capability, in order to improve frequency diversity performance of the UE, the UE may work in a limited frequency band (referred to as a Bandwidth Part (BWP), which is a part of the carrier) with good performance at different times. That is, the UE may receive or transmit control information and data within different BWPs at different times.

As the UE's demand for broadband wireless services bursts and the scarcity of spectrum resources becomes increasingly acute, mobile operators have begun to consider unlicensed bands (also referred to as unlicensed spectrum) as a supplement to licensed bands. The 3rd Generation Partnership Project (3GPP) has identified a scheme for efficient carrier aggregation through unlicensed bands and licensed bands, and effectively improves the spectrum utilization rate of the entire network under the premise of ensuring no significant impact on other technologies in the unlicensed bands.

Unlicensed bands are generally allocated for some other purposes, for example, a radar or wireless fidelity (Wi-Fi) of 802.11 series. In this manner, the interference level is undefined in an unlicensed band, causing the quality of service (QoS) of LTE transmission more difficult to be guaranteed, but an unlicensed band may be used for data transmission with low QoS requirements. Herein, a long-term evolution (LTE) system of a secondary cell deployed on unlicensed bands is referred to as a licensed assisted access (LAA) system. In unlicensed bands, how to avoid mutual interference between a LAA system and another wireless system (for example, a radar or Wi-Fi) is a key issue. Carrier sensing is a mechanism for avoiding collision generally used in unlicensed bands. A mobile station (STA) is required to detect a radio channel before transmitting a signal, and can only occupy the radio channel to transmit a signal when detecting that the radio channel is in idle. Carrier sensing can also be referred to as a Listen Before Talk (LBT). The LAA also follows a similar mechanism to ensure less interference with other signals.

Since the bandwidth of the carrier is relatively large in the NR system, that performing carrier sensing over the entire carrier bandwidth will reduce an opportunity of utilizing the carrier. It is attributable to that a part of the entire carrier bandwidth is probably busy, other parts are idle, and the result of performing carrier sensing over the entire carrier bandwidth may be busy, such that resources within the entire carrier bandwidth cannot be utilized, resulting in wasting carrier resources and low spectrum utilization.

For a LAA-based carrier sensing process, the process includes: performing, by an LAA device (a base station or a user equipment), dynamic switching based on a carrier sensing result, that is, transmitting when channel is detected to be idle, and not transmitting when channel is detected to be busy. In a LAA system of LTE, a frequency bandwidth sensed by a base station performing carrier is a bandwidth of the carrier, and bandwidth capability of all UEs is greater than or equal to the bandwidth of the carrier. Therefore, all UEs perform carrier sensing on the entire bandwidth of the carrier.

Carrier sensing may correspond to carrier monitoring.

The method for processing a physical resource provided by the present application may be applied to a shared frequency band or an unlicensed frequency band, and a transmitting end device (including a base station and a UE) performs carrier sensing before transmitting data, and the transmitting end device can transmit data only when the carrier sensing result is idle. If the carrier sensing result is busy, the transmitting end device cannot transmit data. The method provided by the present application may be applied to downlink data transmission, that is, a base station transmits data, and a UE receives data, and at this time, the base station performs carrier sensing; and the method may also be applied to uplink data transmission, that is, a UE transmits data, and a base station receives data, and at this time, the UE performs carrier sensing. The following embodiments of the present application are described by taking downlink data transmission as examples, and uplink data transmission processes can be implemented by referring to the embodiments.

In 5G system, a concept of bandwidth part (BWP) is introduced. The UE performs receiving and transmitting within one BWP, respectively. A downlink receiving is performed on a downlink BWP, and an uplink transmitting is performed on an uplink BWP. A BWP may be a system bandwidth of the carrier or a part of the system bandwidth. A base station can configure multiple BWPs for a UE, but the UE can only implement transmitting or receiving within one BWP at a time. Such the BWP is called an active BWP. The base station may dynamically indicate the active BWP by dynamic signaling, for example, by scheduling a downlink or uplink DCI of the downlink or uplink data, or by using a predefined timer to return to a default BWP.

Figure 1:
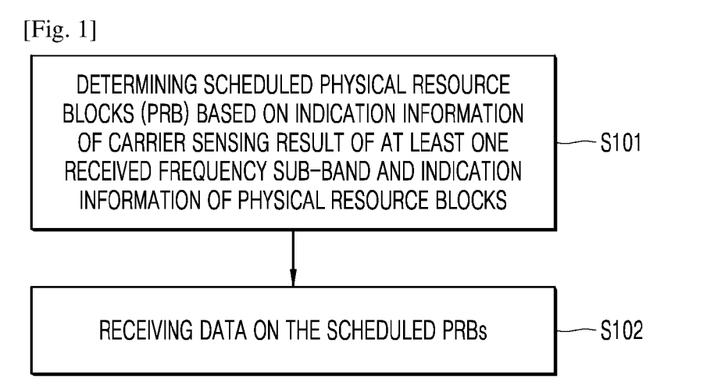
FIG. 1 is a flowchart of a method for processing a physical resource according to an embodiment of the present application.

Based on this, the present application provides a method for processing a physical resource, as shown in FIG. 1, which is a flowchart of the method for processing a physical resource, and the method includes the following steps:

Step 101, determining scheduled physical resource blocks (PRB) based on indication information of carrier sensing result of at least one received frequency sub-band and indication information of physical resource blocks; and Step 102, receiving data on the scheduled PRBs.

In the present application, the method for processing a physical resource is selected based on indication information of the carrier sensing result of received frequency sub-bands and indication information of physical resource blocks, which fully utilizing resources of the frequency sub-bands of which carrier sensing result is idle, thereby simplifying the scheduling manner of resources, and reducing the bit error rate of the data.

Figure 2:
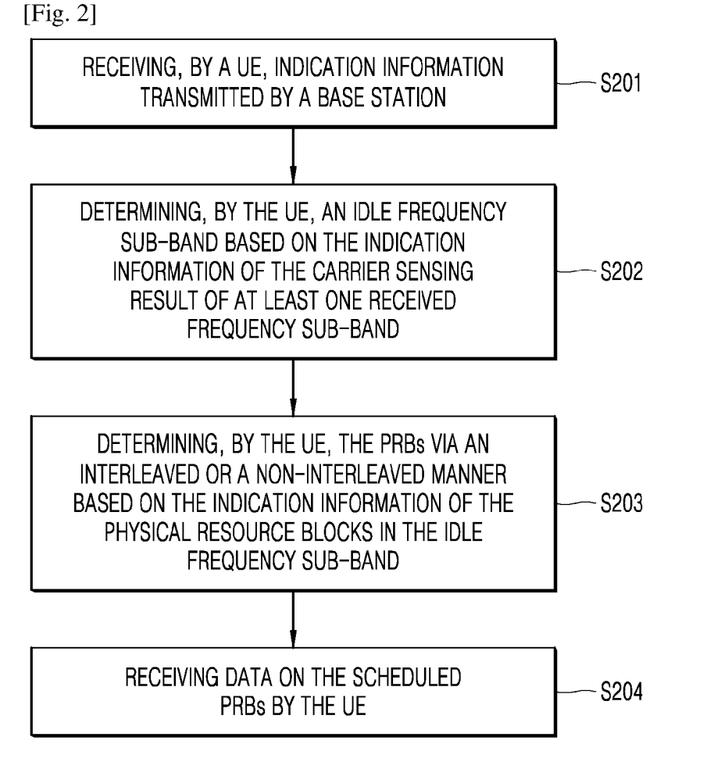
FIG. 2 is a specific processing flowchart of a method for processing a physical resource according to an embodiment of the present application.

Based on the method for processing a physical resource provided by the present application, the method is explained in detail by the following. As shown in FIG. 2, which is a schematic diagram of a specific processing procedure of the method for processing a physical resource provided by the present application, the method includes the following steps:

Step 201, receiving, by a UE, the indication information transmitted by a base station.

The indication information carries indication information of carrier sensing result of at least one frequency sub-band and indication information of the physical resource blocks.

Wherein, the carrier sensing result may include two states, which are idle and busy respectively.

In prior art, a bandwidth sensing an uplink carrier is equal to a bandwidth occupied by uplink transmission, that is, a system bandwidth of the carrier, and a bandwidth sensing a downlink carrier is also equal to a system bandwidth of carrier, for example, 20 MHz. That is, the carrier sensing needs to be performed over the entire system bandwidth. In a new system, a BWP that can support actual downlink or uplink to be transmit is only part of system bandwidth. If a system bandwidth-based carrier sensing is still used, it will lead to an overly conservative access mechanism. For example, in a new system, with the enhanced capabilities of a base station and a UE, downlink or uplink transmission may support greater bandwidth (BW), e.g. 80 MHz bandwidth. The transmission can be transmitted over the entire BW at each time, or only over part of the BW, for example, 20 MHz is a minimum transmission bandwidth. Then, if the expected transmission bandwidth is only at 20 MHz, but still needs to perform carrier sensing at 80 MHz, a failure of carrier sensing at 80 MHz may occur due to interference at other 60 MHz in 80 MHz, resulting in a transmitting end is unable to transmit a signal even if there is no interference at expected transmission bandwidth of 20 MHz.

Figure 3:
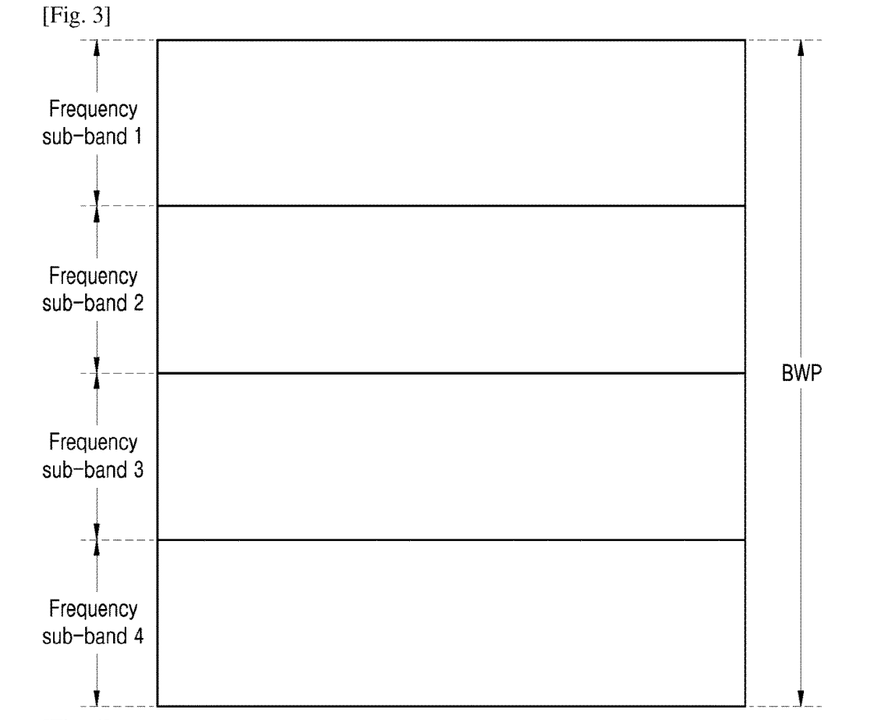
FIG. 3 is a diagram of bandwidth of frequency sub-bands performing carrier sensing according to an embodiment of the present application.

In order to avoid performance loss caused by such a conservative access mechanism, carrier sensing performed by a transmitting end before transmission may be smaller than a bandwidth (BW). For example, the BW may be divided into M1 sub-bands, such as M1=4, and each sub-band has a bandwidth of 20 MHz. The transmitting end may perform carrier sensing on the M1 sub-bands respectively and transmit signals on one or more sub-bands that successfully complete the carrier sensing. As shown in FIG. 3, the downlink BWP configured by the UE includes 4 sub-bands, and each of sub-bands performs carrier sensing, then the UE receives data on the sub-bands of which carrier sensing result is idle, and physical resource blocks (PRB) on multiple sub-bands may be scheduled by downlink control information (DCI).

Based on variation of the transmitting end, the indication information transmitted by the transmitting end includes any one of the following:

If the transmitting end is a base station, the indication information may be:

a. Group-Common Downlink Control Information (GC-DCI);

The indication information of the carrier sensing result of the frequency sub-bands received by the UE may be obtained by using the GC-DCI, for example, indicating a carrier sensing result of 4 frequency sub-bands in one GC-DCI, and by using 4-bit indication information, the indication information of each bit indicates that the carrier sensing result of the frequency sub-bands is busy and idle. Such a method can provide not only an indication for the UE to receive data but also an indication for the UE to receive a reference signal (for example, a Channel State Information-Reference Signal (CSI-RS)), and the frequency sub-bands indicated in one GC-DCI may not be in the downlink active BWP of the UE. The advantage of adopting such an indicating method is that the UE can correctly receive data in the frequency sub-bands in which carrier sensing result is idle through the indicated information, and meanwhile, can correctly receive a reference signal. The disadvantage thereof is that if the UE does not correctly receive the indication information, the UE cannot correctly interpret the PDCCH scheduling the PDSCH, and although the PDCCH scheduling the PDSCH may be correctly received, the PDSCH cannot be correctly received.

b. DCI for scheduling the PDSCH;

The indication information of the carrier sensing result of the frequency sub-bands received by the UE may be obtained by using indication information in the UE-specific DCI scheduling the PDSCH. For example, the indication information 2-bit in the DCI scheduling PDSCH indicates the carrier sensing result of 2 frequency sub-bands in the downlink active BWP, and then allocation information of frequency domain resources allocates physical resource blocks in the frequency sub-bands of which carrier sensing result is idle to the UE. The advantage of adopting such an indicating method is that the UE correctly interprets the PDCCH as long as the UE receives the PDCCH scheduling the PDSCH correctly, since the PDCCH scheduling the PDSCH includes the indication information of the carrier sensing result.

c. In case that transmitting end is a user equipment, the indication information may be Group-Common Downlink Control Information (GC-UCI).

For the indication information of the physical resource blocks in the indication information, it can be divided into two types, which are respectively called resource allocation type 0 and resource allocation type 1; wherein, in the following description of the resource allocation types, a downlink processing is taken an example for explanation.

The resource allocation type 0 is to divide all the PRBs in the downlink active BWP into multiple resource block groups (RBGs), and each bit information in the allocation information of the physical resources in downlink frequency domain in the DCI indicates an allocation state of one RBG, for example, a bit value of "0" indicates that the RBG corresponding to the bit is not scheduled, and a bit value of "1" indicates that the RBG corresponding to the bit is scheduled.

The resource allocation type 1 is a resource allocation type that allocates logically consecutive physical resource blocks to the UE, and indicates the start PRB and the number of consecutive PRBs within the BWP. The resource allocation type 1 is divided into an interleaved allocation manner and a non-interleaved allocation manner. The non-interleaved allocation manner is that the consecutive physical resource blocks indicated in the DCI are actual consecutive physical resource blocks. For example, if a downlink BWP includes 100 PRBs, and 10 PRBs starting from PRB 0 are indicated in the DCI, then the actually allocated physical resource blocks are PRB 0 to PRB 9. The interleaved allocation manner is that consecutive logical physical resource blocks (logical physical resource blocks are also referred to as virtual resource blocks (VRB)) indicated in the DCI are mapped to actual discrete physical resource blocks according to a certain mapping rule. For example, if a downlink BWP includes 100 PRBs, and 10 virtual resource blocks starting from PRB 0 are indicated in the DCI, then the actually allocated physical resource blocks are PRB 0, PRB 10, PRB 20, PRB 30, PRB 40, PRB 50, PRB 60, PRB 70, PRB 80, PRB 90, that is, these 10 physical resource blocks with an interval of 10.

Step 202, determining, by the UE, idle frequency sub-bands based on the indication information of the carrier sensing result of at least one received frequency sub-band.

In this step, the UE performs judgment based on the indication information of the carrier sensing result of each frequency sub-band, and determines frequency sub-bands of which carrier sensing result is idle.

Step 203, determining, by the UE, the PRBs via an interleaved or a non-interleaved manner, based on indication information of the physical resource blocks in the idle frequency sub-bands.

In this step, it will be respectively interpreted in detail that the processing of determining the PRBs via an interleaved manner and the process of determining the PRBs via a non-interleaved manner, by the UE.

When multiple frequency sub-bands are configured in a downlink active BWP and each frequency sub-band independently performs carrier sensing, then the resource allocation type 1 is used, and the PRBs which are able to be allocated are located in the frequency sub-bands of which carrier sensing result is idle; for example, 4 frequency sub-bands are configured within the downlink active BWP, 100 PRBs per frequency sub-band, a total of 400 PRBs, the first frequency sub-band includes PRB 0 to PRB 99, the second frequency sub-band includes PRB 100 to PRB 199, the third frequency sub-band includes PRB 200 to PRB 299, and the fourth frequency sub-band includes PRB 300 to PRB 399. When a non-interleaved allocation manner is used, allocated resources indicated in the DCI are PRB 20 to PRB 150, the carrier sensing results of the first frequency sub-band and the third frequency sub-band are idle, and the carrier sensing results of the second frequency sub-band and the fourth frequency sub-band are busy; then the UE can receive data at PRB 20 to PRB 99 since the carrier sensing result of the first frequency sub-band is idle, and the UE cannot receive data at PRB 100 to PRB 150 since the carrier sensing result of the second frequency sub-band is busy, which may affect bit error rate performance of the data.

Based on this, firstly, that determining, by the UE, the PRBs via a non-interleaved manner based on indication information of the physical resource blocks in the idle frequency sub-bands, is interpreted, specifically:

numbering the PRBs in the idle frequency sub-bands consecutively; determining the corresponding PRBs by mapping the VRBs indicated in the indication information of the physical resource blocks to the consecutively numbered VRBs in the idle frequency sub-bands.

Specifically, when multiple frequency sub-bands are configured in a downlink active BWP, and each frequency sub-band independently performs carrier sensing, the resource allocation type 1 is used; the VRBs indicated by the DCIs are mapped to the frequency sub-bands of which the carrier sensing results are idle, that is, the PRBs of the frequency sub-bands of which the carrier sensing results are idle are arranged as consecutively numbered PRBs for data transmission, but in fact, the frequency sub-bands of which the carrier sensing results are idle may not be consecutive. For example, the downlink active BWP is configured with four frequency sub-bands, each frequency sub-band is configured with 100 PRBs, and a total of 400 PRBs. The 400

Figure 4:
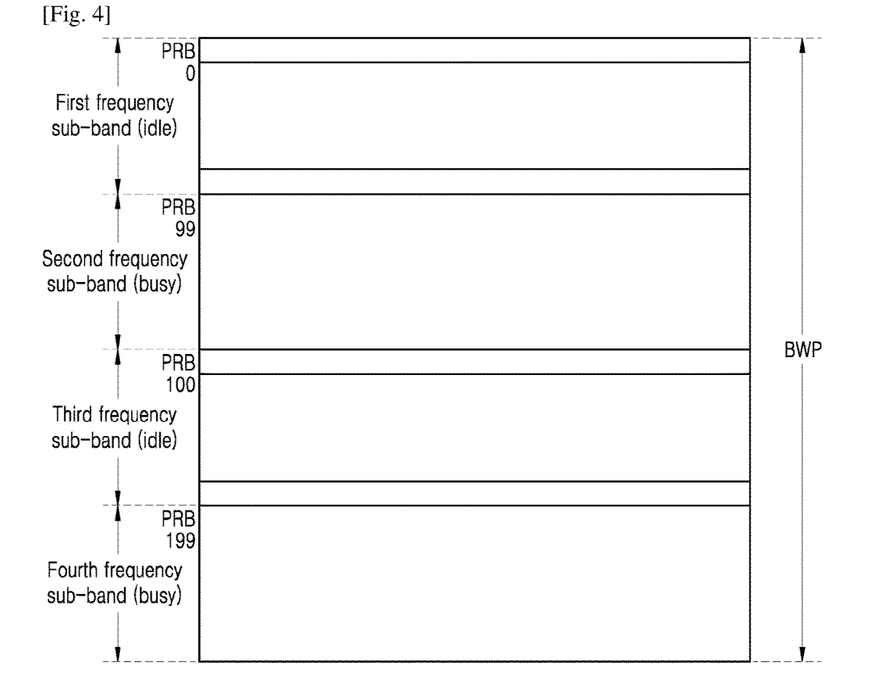
FIG. 4 is a diagram of a distribution of PRBs according to an embodiment of the present application.

PRBs are consecutive, and each frequency sub-band independently performs carrier sensing. Assuming that the carrier sensing results of the first frequency sub-band and the third frequency sub-band are idle, and the carrier sensing results of the second frequency sub-band and the fourth frequency sub-band are busy, at this point, the first frequency sub-band and the third frequency sub-band of which carrier sensing results are idle are inconsecutive, and the consecutively numbered PRB resources used for allocation are: the first frequency sub-band including PRB 0 to PRB 99, the third frequency sub-band including PRB 100 to PRB 199. As shown in FIG. 4, the virtual PRB 0 to the virtual PRB 199 indicated in the DCI (the virtual PRB is the VRB) may be mapped in one-to-one correspondence with the PRB 0 to PRB 99 in the first frequency sub-band and the PRB 100 to PRB 199 in the third frequency sub-band. When the non-interleaved allocation manner is used and the allocated resources indicated in the DCI are the virtual PRB 20 to the virtual PRB 150, the virtual PRB 20 to the virtual PRB 99 are located in the first frequency sub-band and the virtual PRB 100 to the virtual PRB 150 are located in the third frequency sub-band. Thus, the UE receives data at PRB 20 to PRB 99 of the first frequency sub-band, and receives data at PRB 100 to PRB 150 of the third frequency sub-band at the same time, so that the bit error rate performance of the data is not affected.

The process of the method is: first, knowing, by the UE, the frequency sub-bands of which the carrier sensing result is idle by receiving indication information, and then numbering the PRBs in the frequency sub-bands of which the carrier sensing result is idle consecutively, and finally, mapping the VRBs allocated in the DCI to consecutively numbered PRBs in the frequency sub-bands of which carrier sensing result is idle.

The determining, by the UE, the PRBs via an interleaved manner based on indication information of the physical resource blocks in the idle frequency sub-bands, is further interpreted, specifically:

for the interleaved manner, interleaving may be performed in each frequency sub-band, or may be performed on the PRBs consecutively numbered within all frequency sub-bands of which carrier sensing results are idle, such as a and b described below.

a. Interleaving in each frequency sub-band.

Mapping the VRBs indicated in indication information of the physical resource blocks to the PRBs in the idle frequency sub-bands; and interleaving on the PRBs mapped to each idle frequency sub-band to determine the corresponding PRBs.

Specifically, interleaving in each frequency sub-band is to first map the virtual PRBs indicated in the DCI to the PRBs in each idle frequency sub-band, and then interleaving the PRBs mapped into each frequency sub-band. For example, the downlink active BWP is configured with 4 frequency sub-bands, each frequency sub-band is configured with 100 PRBs, a total of 400 PRBs, and each frequency sub-band independently performs carrier sensing; assuming, the carrier sensing results of the first frequency sub-band and the third frequency sub-band are idle, and the carrier sensing results of the second frequency sub-band and the fourth frequency sub-band are busy, at this point, the consecutively numbered PRB resources used for allocation are: the first frequency sub-band including PRB 0 to PRB 99, and the third frequency sub-band including PRB 100 to PRB 199. When the allocated physical resources indicated in the DCI are the virtual PRB 20 to the virtual PRB 150, the virtual PRB 20 to the virtual PRB 99 are located in the first frequency sub-band, and the virtual PRB 100 to the virtual PRB 150 are located in the third frequency sub-band, and then, the PRB 20 to PRB 99 in the first frequency sub-band are interleaved in the first frequency sub-band, and the PRB 100 to PRB 150 in the third frequency sub-band are interleaved in the second frequency sub-band.

b. Interleaving on PRBs that consecutively numbered in all frequency sub-bands of which the carrier sensing results are idle.

numbering the PRBs in the idle frequency sub-bands consecutively; mapping the VRBs indicated in indication information of the physical resource blocks to the consecutively numbered PRBs in each idle frequency sub-band based on a preset interleaving rule, thereby determining the corresponding PRBs.

Specifically, interleaving on PRBs that consecutively numbered in all frequency sub-bands of which the carrier sensing results are idle is to directly map the virtual PRBs indicated by the DCI to the consecutively numbered PRBs in each idle frequency sub-band based on a preset interleaving rule. For example, the downlink active BWP is configured with 4 frequency sub-bands, each frequency sub-band is configured with 100 PRBs, a total of 400 PRBs, and each frequency sub-band independently performs carrier sensing. Assuming the carrier sensing results of the first frequency sub-band and the third frequency sub-band are idle, and the carrier sensing results of the second frequency sub-band and the fourth frequency sub-band are busy, at this point the consecutively numbered PRB resources used for allocation are: the first frequency sub-bands including PRB 0 to PRB 99, and the third frequency sub-band including PRB 100 to PRB 199. When the allocated physical resources indicated in the DCI are the virtual PRB 20 to the virtual PRB 150, the virtual PRB 20 to the virtual PRB 150 are mapped to the 131 PRBs from PRB 0 to PRB 199 based on a preset interleaving rule.

In the technical solution of the present application, a process for performing a bundling operation on the PRBs is further included, and the process includes:

determining a frequency domain PRB bundling group, and precoding a PRB located in the same PRB bundling group by using the same precoding matrix.

The following two schemes for determining a PRB bundling group are included:

Scheme One:

Regardless of whether the idle frequency sub-bands are consecutive frequency sub-bands, respective PRBs in any PRB group are located in one frequency sub-band;

grouping the frequency domain PRBs bundling in each frequency sub-band;

the PRB bundling is performed in each frequency sub-band, that is, a PRB group adopting the same precoding is located in one frequency sub-band, and there is no one PRB group locating in two frequency sub-bands. For example, the downlink active BWP is configured with four frequency sub-bands, each frequency sub-band is configured with 100 PRBs, a total of 400 PRBs, and each frequency sub-band independently performs carrier sensing. Assuming the carrier sensing results of the first frequency sub-band and the second frequency sub-band are idle, and the carrier sensing results of the third frequency sub-band and the fourth frequency sub-band are busy, at this point, the consecutively numbered PRB resources used for allocation are: the first frequency sub-band including PRB 0 to PRB 99, and the second frequency sub-band including PRB 100 to PRB 199. When the non-interleaved allocation manner is used, the allocated physical resources indicated in the DCI are the virtual PRB 97 to the virtual PRB 107, and the size of the PRB group is 4; then the virtual PRB 97, the virtual PRB 98, and the virtual PRB 99 are in one PRB group and located in the first frequency sub-band; the virtual PRB 100, the virtual PRB 101, the virtual PRB 102, and the virtual PRB 103 are in one PRB group and located in the second frequency sub-band; the virtual PRB 104, the virtual PRB 105, the virtual PRB 106, and the virtual PRB 107 are in one PRB group and also located in the second frequency sub-band.

Scheme Two:

If the idle frequency sub-bands are consecutive frequency sub-bands, there may be that each PRB in a particular PRB group is located in two consecutive frequency sub-bands.

grouping the frequency domain PRB bundling in one or more consecutive frequency sub-bands:

a PRB bundling is performed in multiple consecutive frequency sub-bands of which the carrier sensing results are idle, that is, the PRB groups using the same precoding are located in one or more consecutive frequency sub-bands, and the PRB bundling groups in the inconsecutive frequency sub-bands of which the carrier sensing results are idle are determined respectively. There is no one PRB bundling group locating in two inconsecutive frequency sub-bands, and there may be a PRB bundling group locating in two consecutive frequency sub-bands. For example, the downlink active BWP is configured with 4 frequency sub-bands, each frequency sub-band is configured with 100 PRBs, a total of 400 PRBs, and each frequency sub-band independently performs carrier sensing. Assuming the carrier sensing results of the first frequency sub-band and the second frequency sub-band are idle, and the carrier sensing results of the third frequency sub-band and the fourth frequency sub-band are busy, at this point, the consecutively numbered PRB resources used for allocation are: the first frequency sub-band including PRB 0 to PRB 99, and the second frequency sub-band including PRB 100 to PRB 199, and the two frequency sub-bands being consecutive. At this point, the PRB bundling is performed in multiple consecutive frequency sub-bands of which the carrier sensing results are idle. When the non-interleaved allocation manner is used, the allocated physical resources indicated in the DCI are the virtual PRB 97 to the virtual PRB 107, and the size of the PRB group is 4, then the virtual PRB 97, the virtual PRB 98, the virtual PRB 99, and the virtual PRB 100 are in one PRB group and located in the first frequency sub-band and the second frequency sub-band; the virtual PRB 101, the virtual PRB 102, the virtual PRB 103, and the virtual PRB 104 are in one PRB group and are located in the second frequency sub-band; the virtual PRB 105, the virtual PRB 106, and the virtual PRB 107 are one PRB group and are also located in the second frequency sub-band.

For example, the downlink active BWP is configured with 4 frequency sub-bands, each frequency sub-band is configured with 100 PRBs, a total of 400 PRBs, and each frequency sub-band independently performs carrier sensing. Assuming the carrier sensing results of the first frequency sub-band and the third frequency sub-band are idle, and the carrier sensing results of the second frequency sub-band and the fourth frequency sub-band are busy, and the first frequency sub-band and the third frequency sub-band are inconsecutive, at this point, the PRB bundling is performed independently on respective inconsecutive frequency sub-bands of which carrier sensing results are idle. At this time, the consecutively numbered PRB resources used for allocation are: the first frequency sub-band including PRB 0 to PRB 99, and the third frequency sub-band including PRB 100 to PRB 199. When the non-interleaved allocation manner is used, the allocated physical resources indicated in the DCI are the virtual PRB 97 to the virtual PRB 107, and the size of the PRB group is 4, then the virtual PRB 97, the virtual PRB 98, and the virtual PRB 99 are in one PRB group and located in the first frequency sub-band; the virtual PRB 100, the virtual PRB 101, the virtual PRB 102, and the virtual PRB 103 are in one PRB group and located in the third frequency sub-band; the virtual PRB 104, the virtual PRB 105, the virtual PRB 106, and the virtual PRB 107 are in one PRB group and also located in the third frequency sub-band.

Step 204, receiving data on the scheduled PRBs by the UE.

In this step, for each idle frequency sub-band, the UE receives the corresponding data on the scheduled PRBs.

Figure 5:
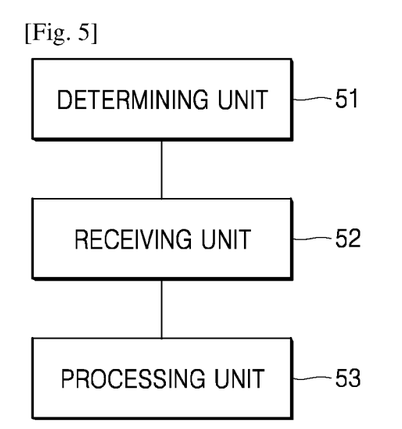
FIG. 5 is a structural diagram of a user equipment according to an embodiment of the present application.

Based on the foregoing method for processing a physical resource provided by the present application, the present application further provides an electronic device which may correspond to a user equipment, as shown in FIG. 5, including:

a determining unit 51, configured to determine scheduled physical resource blocks (PRB) based on indication information of carrier sensing result of at least one received frequency sub-band and indication information of physical resource blocks; and a receiving unit 52, configured to receive data on the scheduled PRBs.

The determining unit 51 is configured to determine idle frequency sub-bands based on indication information of carrier sensing result of at least one received frequency sub-band, and determine the PRBs via an interleaved or non-interleaved manner based on indication information of the physical resource blocks in the idle frequency sub-bands.

The determining unit 51 is specifically configured to number the PRBs in the idle frequency sub-bands consecutively, and map the virtual resource blocks (VRB) indicated in indication information of the physical resource blocks to the consecutively numbered PRBs in the idle frequency sub-bands to determine the corresponding PRBs.

The determining unit 51 is specifically configured to number the PRBs in all idle frequency sub-bands consecutively; and map the virtual resource blocks (VRB) indicated in indication information of the physical resource blocks to the consecutively numbered PRBs in the idle frequency sub-bands based on a preset interleaving rule to determine the corresponding PRBs.

The determining unit 51 is specifically configured to map the virtual resource blocks (VRB) indicated in indication information of the physical resource blocks to the PRBs in the idle frequency sub-bands, and interleave the PRBs mapped in each idle frequency sub-band to determine the corresponding PRBs.

The processing unit 53 is configured to perform a bundling operation on the PRBs determined in the idle frequency sub-bands based on the predetermined size information of a PRB group to determine the PRB group.

The PRB group includes any of the following:

each PRB in any PRB group is located in one frequency sub-band;

if the idle frequency sub-bands are consecutive frequency sub-bands, each PRB in a particular PRB group is located in two consecutive frequency sub-bands.

Based on the foregoing method for processing a physical resource provided by the present application, the present application further provides an electronic device, including a memory and a processor, wherein the memory is configured to store a computer program, when executed by the processor, for implementing the steps of the foregoing method for processing a physical resource.

In the present application, scheduled physical resource blocks (PRB) are determined based on indication information of carrier sensing result of at least one received frequency sub-band and indication information of physical resource blocks and data are received on the scheduled PRBs, thereby realizing the reasonable utilization of carrier resources, fully utilizing resources of the frequency sub-bands of which carrier sensing result is idle, simplifying the scheduling manner of resources, and reducing the bit error rate of the data.

Figure 6:
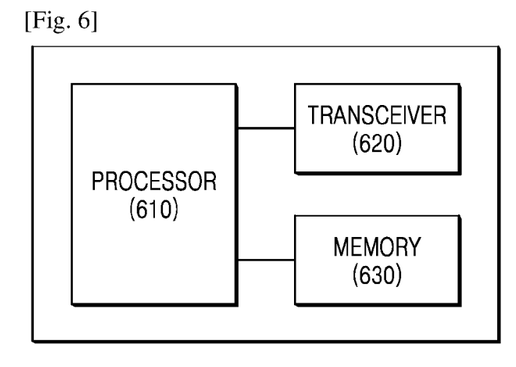
FIG. 6 is a block diagram illustrating the structure of a user equipment (UE) according to another embodiment of the present disclosure.

FIG. 6 is a block diagram illustrating the structure of a user equipment according to another embodiment of the present disclosure. The user equipment may be an electronic device.

Referring to the FIG. 6, the user equipment 600 may include a processor 610, a transceiver 620 and a memory 630. However, all of the illustrated components are not essential. The user equipment 600 may be implemented by more or less components than those illustrated in FIG. 6. In addition, the processor 610 and the transceiver 620 and the memory 630 may be implemented as a single chip according to another embodiment. The processor 610 may correspond to the processing unit 53 and the determining unit 51 of FIG. 5. The transceiver 620 may correspond to a receiving unit 52 of FIG. 5.

The aforementioned components will now be described in detail.

The processor 610 may include one or more processors or other processing devices that control the proposed function, process, and/or method. Operation of the user equipment 600 may be implemented by the processor 610.

The processor 610 may determine scheduled physical resource blocks (PRB) based on indication information of carrier sensing result of at least one received frequency sub-band and indication information of physical resource blocks and receive data on the scheduled PRBs.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the device 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

It should be understood by those skilled in the art that the present application involves devices for carrying out one or more of operations as described in the present application. Those devices may be specially designed and manufactured as intended, or may comprise well known devices in a general-purpose computer. Those devices have computer programs stored therein, which are selectively activated or reconstructed. Such computer programs may be stored in a device (e.g. a computer) readable medium or in any type of medium suitable for storing electronic instructions and respectively coupled to a bus, and the computer readable medium includes but are not limited to any type of disks (including floppy disks, hard disks, optical disks, CD-ROM and magneto optical disks), an ROM (Read-Only Memory), an RAM (Random Access Memory), an EPROM (Erasable Programmable Read-Only Memory), an EEPROM (Electrically Erasable Programmable Read-Only Memory), a flash memory, a magnetic card or an optical line card. In other words, the readable medium comprises any medium storing or transmitting information in a device (e.g., a computer) readable form.

It should be understood by those skilled in the art that computer program instructions may be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It may be understood by those skilled in the art that the steps, measures and solutions in the operations, methods and flows already discussed in the present application may be alternated, changed, combined or deleted. Further, other steps, measures and solutions in the operations, methods and flows already discussed in the present application may also be alternated, changed, rearranged, decomposed, combined or deleted. Further, the steps, measures and solutions in the art in the operations, methods and operations disclosed in the present application may also be alternated, changed, rearranged, decomposed, combined or deleted.

The foregoing descriptions are merely some implementations of the present application. It should be noted that, to those skilled in the art, various improvements and modifications may be made without departing from the principle of the present application, and these improvements and modifications shall be regarded as falling into the protection scope of the present application.

The invention claimed is:

1. A method performed by a terminal in a wireless communication system, the method comprising:
receiving, from a base station, information on frequency sub-bands of which listen before talk (LBT) results are idle;
mapping virtual resource blocks (VRBs) in the frequency sub-bands of which the LBT results are idle, to physical resource blocks (PRBs); and
transmitting data in case that a result of the LBT is an idle state,
wherein the information is transmitted via group-common downlink control information (GC-DCI), and
after determining that the frequency sub-bands of which the LBT results are idle are inconsecutive and an interleaved allocation mode is used, the PRBs are consecutively numbered in the frequency sub-bands of which the LBT results are idle.

2. The method of claim 1, further comprising performing a PRB bundling,
wherein the PRBs in a PRB group are located in one frequency sub-band or in a plurality frequency sub-bands based on the PRB bundling.

3. The method of claim 2, wherein the PRB bundling is performed based on predetermined size information of a PRB group, to determine the PRB group.

4. The method of claim 3, wherein PRBs in the PRB group are located in one frequency sub-band.

5. A terminal in a wireless communication system, the terminal comprising:
- a transceiver; and
- at least one processor coupled with the transceiver and configured to:
  - receive, from a base station, information on frequency sub-bands of which listen before talk (LBT) results are idle,
  - map virtual resource blocks (VRBs) in the frequency sub-bands of which the LBT results are ide, to physical resource blocks (PRBs), and
  - transmit data in case that a result of the LBT is an idle state,
  - wherein the information is transmitted via group-common downlink control information (GC-DCI), and
  - in case that the frequency sub-bands of which the LBT results are idle are inconsecutive and an interleaved allocation mode is used, the PRBs are consecutively numbered in the frequency sub-bands of which the LBT results are idle.

6. The terminal of claim 5, wherein, the at least one processor is further configured to perform a PRB bundling, and
- wherein the PRBs in a PRB group are located in one frequency sub-band or in plurality frequency sub-bands based on the PRB bundling.

7. The terminal of claim 6, wherein the PRB bundling is performed based on predetermined size information of a PRB group, to determine the PRB group.

8. The terminal of claim 7, wherein PRBs in the PRB group is located in one frequency sub-band.

* * * * *